2,895,982
COMPLEX NITROPHENYL PHOSPHATES

Alan R. Stiles, Denver, Colo., assignor to Shell Development Company, New York, N.Y., a corporation of Delaware No Drawing. Application April 9, 1956
Serial No. 576,786

3 Claims. (Cl. 260—461)

This invention relates to a new class of neutral esters of phosphoric acid which have been found to have particular utility as insecticides.

The compounds of the invention are beta-phosphato-derivatives of the hydrocarbyl esters of alpha,beta-olefinically unsaturated monocarboxylic acids, wherein one of the hydrogen atoms of the phosphato group has been replaced by a nitrophenyl group, these compounds having the structure represented by the formula:

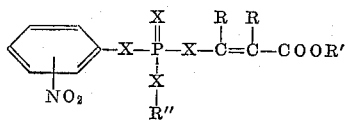

wherein X represents a chalcogen element, preferably one having an atomic number of less than 20, R represents a member of the group consisting of the hydrogen atom and hydrocarbyl groups, and R' and R" each represents a hydrocarbyl group.

In these compounds it is preferred that the hydrocarbyl groups represented by R, R' and R" be hydrocarbon groups containing from one to about eight carbon atoms each. The groups represented by these symbols thus include aliphatic—including cyclo-aliphatic—hydrocarbon groups such as alkyl groups of either straight-chain or branched-chain configuration, cycloalkyl groups and their unsaturated analogs, aryl groups, and combinations of such groups, such as araliphatic and aryl groups substituted by one or more aliphatic groups, e.g., aralkyl and alkaryl groups. Preferably such groups contain not more than about eight carbon atoms each, considering both ring and non-ring carbon atoms. It is particularly preferred that the groups represented by R, R' and R" be alkyl groups, the lower alkyl groups—particularly those containing six carbon atoms or less each—being the most desirable members of this preferred group. The groups represented by R, R' and R" may each be the same or they may be different.

The nitro substituent group of the nitrophenyl group may be located at any position in the ring; it is preferred, however, that it be located in the para position of the ring relative to the carbon atom attached to the linking oxy-oxygen atom.

The compounds of the invention are conveniently prepared by reacting a hydrocarbyl ester of an alpha-chloro, beta-chalcogen fatty acid with a dihydrocarbyl nitrophenyl phosphite according to the equation

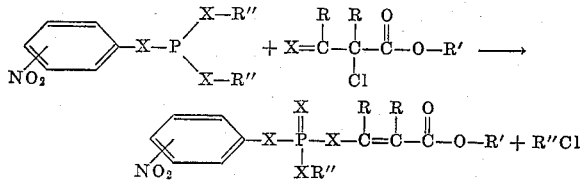

wherein X, R, R' and R" have the meanings previously assigned to these symbols.

The chloroester reactant can be obtained by reacting a beta-chalcogen fatty acid ester with sulfuryl chloride according to the method described by MacBeth in Journal of the American Chemical Society, volume 123, p. 1122 et seq. at p. 1125 (1925).

The dihydrocarbyl nitrophenyl phosphite reactant is prepared by reacting a trihydrocarbyl phosphite [(R"O)₃P] with phosphorus trichloride in the molar proportion of about 2 moles of phosphite per mole of phosphorous trichloride to form the dihydrocarbyl phosphorochloridite [(RO)₂PCl] and thereafter reacting in an inert solvent the phosphorochloridite with an equimolar amount of nitrophenol in the presence of an equal number of moles of an acid acceptor, such as pyridine or a dialkylaniline, to form the dihydrocarbyl nitrophenyl phosphite. The reaction between the triphydrocarbyl phosphite and phosphorous trichloride is described in Journal of the American Chemical Society, volume 47, p. 762 et seq., at pp. 764–5 (1923), and Journal of the Chemical Society, 1940, p. 1464 et seq., at p. 1466. The reaction of the phosphorochloridite with the phenol is carried out by the methods described in Kosolapoff, "Organo-Phosphorus Compounds," Wiley and Sons (1950), at section II of chapter 8, pp. 184–185, for reacting a dichlorophosphite with an alkanol in the presence of an acid acceptor to form the dialkyl chlorophosphite.

The reaction between the chloroester reactant and the phosphite reactant is effected by slowly mixing about an equimolar amount of the chloroester with the phosphite, the temperature being controlled either by heating or by cooling as necessary to maintain the reaction temperature within the range of from about 60° C. to about 150° C. The by-product hydrocarbyl chloride may be removed from the reaction zone as it is formed by adjusting the pressure in the reaction system so that the hydrocarbyl halide volatilizes while the product phosphate and the reactants do not. However, in many cases the boiling point of the hydrocarbyl halide by-product will be fairly close to the boiling point of the chloroester reactant, so that such a technique is undesirable; in such cases, the formed hydrocarbyl chloride is most conveniently allowed to remain in the reaction zone until the desired reaction is substantially complete and then is removed together with the relatively small amount of unreacted chloroester reactant by distillation of the reaction mixture under reduced pressure. Some of the higher molecular weight reactants and reaction products are solids at ordinary temperatures; in these cases use of an inert solvent such as xylene insures a fluid reaction system. To insure complete reaction between the chloroester and the phosphite the reaction mixture is heated for a reasonable time—e.g., from about one hour to about six hours—after addition of all of the chloroester.

The phosphate product is usually recovered by distillation under sufficiently low pressure that thermal decomposition of the product is avoided. With the higher molecular weight products, however, it is often convenient to recover the phosphate by crystallization or by molecular distillation.

Preparation of typical members of the compounds of the invention is described in detail in the following examples. These examples are intended to be illustrative and exemplary in character only and are not to be considered as limiting the invention in any way.

EXAMPLE I

*Preparation of 2-carbomethoxy-1-methylvinyl methyl p-nitrophenyl phosphate* a. *Preparation of dimethyl phosphorochloridite.*—133.4 grams (1 mole) of phosphorus trichloride was added over a 30 minute period to 248.2 grams (2 moles) of trimethyl phosphite. The heat of reaction raised the temperature of the mixture to 80° C. The mixture was then heated for about 30 minutes, the temperature gradually rising to 98° C., refluxing occurring continuously. The mixture was then cooled and distilled at 10–20 millimeters mercury pressure to a temperature of 25° C. The crude product was then redistilled twice at atmospheric pressure to give as product a material having a boiling point of 103–105° C. at 1 atmosphere pressure and identified by analysis as dimethyl phosphorochloridite. Yield: 21.6% of theoretical.

*b. Preparation of dimethyl p-nitrophenyl phosphite.—* 77 grams (0.6 mole) of the dimethyl phosphorochloridite thus prepared was added over a one hour period to a mixture of 85.5 grams (0.61 mole) of p-nitrophenol and 94 grams (0.63 mole) of diethylaniline in 400 milliliters of dry ether. The resulting mixture was refluxed and stirred for 2½ hours, was then filtered, to remove the diethylaniline hydrochloride and was distilled to remove the ether solvent. The distillation was conducted by first heating the reaction mixture on a steam bath at atmospheric pressure and then at a pressure of about 18 millimeters of mercury. The crude product was then distilled repeatedly in a molecular still, the final product being a material boiling at 85–87° C. at .001–.005 millimeter of mercury pressure. Elemental and infrared analysis identified the product as dimethyl p-nitrophenyl phosphite. Yield: 56.3% of theoretical.

*c. Preparation of 2-carbomethoxy-1-methylvinyl methyl p-nitrophenyl phosphate.—* 76.5 grams (0.33 mole) of the dimethyl p-nitrophenyl phosphite thus prepared was added to 49.8 grams (0.33 mole) of methyl alpha-chloroacetoacetate. The mixture was heated slowly to 120° C. (heating required about ½ hour) and this temperature maintained about one hour. The mixture was stripped for 30 minutes at 85° C. and 20 millimeters mercury pressure. 5.4 grams of methyl chloride distilled off. The mixture was then heated for an additional two hours at 120° C. and then stripped for one hour at 85° C. and 25 millimeters mercury pressure. No methyl chloride distilled off in this stripping operation. The mixture was then distilled three times in a molecular still, the final product being a material boiling at 180–185° C. at 0.001 millimeter mercury pressure and having an index of refraction ($n20/D$) of 1.5280. The elemental and infrared analyses of the product identified it as 2-carbomethoxy-1-methylvinyl methyl p-nitrophenyl phosphate.

EXAMPLE II

*Preparation of 2-carbethoxy-1-methylvinyl ethyl p-nitrophenyl phosphate*

*a. Preparation of diethyl phosphorochloridite.—* This material was prepared by reacting phosphorus trichloride and triethyl phosphite in the manner described in part (*a*) of Example I.

*b. Preparation of diethyl p-nitrophenyl phosphite.—* This reactant was prepared by reacting diethyl phosphorochloridite with p-nitrophenol in the manner described in part (*b*) of Example I.

*c. Preparation of 2-carbethoxy-1-methylvinyl ethyl p-nitrophenyl phosphate.—* 54 grams (0.21 mole) of diethyl p-nitrophenyl phosphite was added slowly to 34.3 grams (0.21 mole) of ethyl alpha-chloroacetoacetate. The mixture was heated to 75° C. after half of the phosphite had been added and after addition of the remaining phosphite was complete the temperature was raised to 120° C. and held at that level for four additional hours. The mixture was then cooled to 85° C. and the pressure reduced to 200 millimeters of mercury and these conditions held for one hour while the formed ethyl chloride was stripped from the mixture. The crude product was then stripped in a Claisen apparatus to 41° C. and 0.2 millimeter mercury pressure and then was stripped in a molecular still at 110° C. and 0.001 millimeter mercury pressure. The residue was then molecularly distilled to give a product boiling at 195° C. at 0.001 millimeter mercury pressure. The index of refraction ($n22/D$) was 1.5190. The elemental analysis and infrared analyses identified the product as 2-carbethoxy-1-methylvinyl ethyl p-nitrophenyl phosphate.

Other compounds of the invention are prepared in a similar fashion. For example, 2-carbethoxyvinyl ethyl p-nitrophenyl phosphate is obtained by reacting ethyl chloroformylacetate with diethyl p-nitrophenyl phosphite; butyl 2-carbethoxy-1-ethylpropenyl o-nitrophenyl phosphate was obtained by reacting ethyl alpha-chloro-alpha-propionyl propionate with dibutyl o-nitrophenyl phosphite; 2-carbethoxy-1-methylvinyl hexyl p-nitrophenyl phosphate is obtained by reacting ethyl alpha-chloroacetoacetate with dihexyl p-nitrophenyl phosphite; 2-carbethoxy-3-methyl-1-butenyl ethyl p-nitrophenyl phosphate is obtained by reacting ethyl alpha-chloro-alpha-formyl-isovalerate with diethyl p-nitrophenyl phosphite; 2-carboisopentyloxy-1-methylvinyl isobutyl m-nitrophenyl phosphate is obtained by reacting isopentyl alpha-chloroacetoacetate with diisobutyl m-nitrophenyl phosphite.

The compounds of the invention having lower molecular weights are liquids at ordinary room temperature; the higher molecular weight compounds of the invention are crystalline solids at such temperatures. The new compounds have particular utility as insecticides because they possess outstanding toxicity to insects when applied as contact insecticides. By the term "insects" is meant not only the members of the class Insecta but also related or similar invertebrate animal organisms belonging to the allied classes of arthropods and including ticks, mites, spiders, wood lice and the like.

The compounds of this invention can be employed for insecticidal purposes by the use of any of the methods which were conveniently employed in that art. For example, the compounds can either be sprayed or otherwise applied in the form of a solution or dispersion, or can be absorbed on an inert finely divided solid and applied as a dust. Useful solutions for application by spraying, brushing, dipping and the like can be prepared by using as a solvent any of the well-known inert horticultural carriers including neutral hydrocarbons such as kerosene and other like mineral oil distillates of intermediate viscosity and volatility. Adjuvants such as spreading or wetting agents can also be included in the solutions representative materials of this character being fatty acids, soaps, rosin salts, saponines, gelatin, casein, long chain fatty alcohols, alkylaryl sulfonates, long chain alkyl sulfonates, phenol ethylene oxide condensates, and the like. The solutions can be employed as such or more preferably, they can be dispersed or emulsified in water and the resulting aqueous dispersion or emulsion applied as a spray. Solid carrier materials which can be employed include talc, bentonite, lime, gypsum, pyrophyllite and similar inert solid diluents. If desired the compound of the invention can be employed as aerosols—as by dispersing the same into the atmosphere by means of a compressed gas.

The concentration of the compounds to be used with the above carriers is dependent on many factors, including the particular compound utilized, the carrier employed, the method and conditions of application and the insect species to be controlled, the proper considerations in resolution of these factors being within the skill of those versed in the insecticide art. In general, however, the compounds of this invention are effective in concentrations of from about 0.01 to about 0.5 percent based upon a total weight of the composition, though under some circumstances as little as about 0.0001 percent or as much as 2 percent or even more of the compound can be employed with good results from insecticidal standpoint.

When employed as an insecticide, the compound of this invention can be employed either as a sole toxic ingredient of the insecticidal composition or it can be employed in conjunction with other insecticidally active materials. Representative insecticides of this latter class include the naturally occurring insecticides such as pyrethrum, rotenone, sabadilla and the like, as well as the various synthetic insecticides including DDT, benzene hexachloride, thiodiphenylamine, cyanide, tetraethyl pyrophosphate, diazobenzene, and the various compounds of arsenic, lead, and/or fluorine.

EXAMPLE III

By way of example of the outstanding effectiveness of the new products of this invention as insecticides, the toxicity of representative products of the invention against the common housefly (*Musca domestica*) was determined using the method described by Y. P. Sun, Journal of Economic Entomology, volume 43, p. 45 et seq. (1950). The toxicities of the test compounds were compared to that of alpha-chlordane, an insecticide widely used against the housefly. The toxicities of the test compounds are expressed in terms of the relationship between the amount of alpha-chlordane required to produce 50% mortality of the test insects and the amount of the test material required to produce the same mortality. Assigning alpha-chlordane an arbitrary rating of 100% the toxicity of the test materials is expressed in terms of the toxicity index, which compares the activity on a percentage basis with that of alpha-chlordane. The results shown in the following table were obtained.

TABLE I

| Compound | Toxicity index |
| --- | --- |
| Alpha-chlordane | 100 |
| 2-carbomethoxy-1-methylvinyl methyl p-nitrophenol phosphate | 560 |
| 2-carbethoxy-1-methylvinyl ethyl p-nitrophenyl phosphate | 650 |

EXAMPLE IV

Solutions or emulsions of representative compounds of the invention were made up employing acetone or a neutral petroleum distillate lying within the kerosene range as a solvent or dispersant. These solutions or emulsions were tested for toxicity against (a) the 2-spotted spider mite (*Tetranychus bimaculatus*), (b) the pea aphid (*Macrosiphum pisi*), (c) the Mexican bean beetle larva (*Epilachna varivestis*), and (d) the southern army worm (*Prodenia eridenia*), by spraying groups of plants infested with the insects under controlled conditions which varied from test to test only in the concentration of the toxic agent and its identity. These toxicities were compared with the toxicity respectively, (a) parathion, (b) nicotine, (c) the gamma isomer of benzene hexachloride, and (d) dieldrin, all insecticides widely used for the destruction of the common insects tested. In each set of tests the conditions were directly comparable—i.e., the same test insect, the same plant, environment and so on were used and the concentration of active material in each case was the same. The toxicities of the test materials are expressed in terms of the relationship between the amount of standard insecticide required to produce 50% mortality of the test insect and the amount of the test material required to produce the same mortality. Assigning the standard insecticide an arbitrary rating of 100% the toxicity of the test materials is expressed in terms of the toxicity index which compares the activity on a percentage basis with that of the standard insecticide. Results are shown in the following table.

TABLE II

| Test insect | 2-spotted spider mite | Mexican bean beetle larva | Pea aphid | Southern Army worm |
| --- | --- | --- | --- | --- |
| Standard | Parathion | Gamma benzene-hexachloride | Nicotine | Dieldrin |
| Test compound: | | | | |
| 2-carbomethoxy-1-methylvinyl methyl p-nitrophenyl phosphate | 160 | 1,000 | 2,100 | 200 |
| 2-carbethoxy-1-methylvinyl ethyl p-nitrophenyl phosphate | | 800 | 3,800 | 150 |

EXAMPLE V

This example illustrates the systemic action of a representative member of the compounds of the invention. The tests were carried out by diluting with water a one percent solution in acetone of each of the insecticides until solutions of desired test strength were obtained. Young growing pinto bean plants infested with 2-spotted spider mites were carefully removed from the soil after which their roots were washed with water and carefully immersed in the test solutions contained in glass flasks, the flasks then being stoppered with cotton around the stem of the plant. The following table shows the concentration of the active agent in the test solution required to kill 50% of the mites on the infected plant within a 48 hour period following immersion of the roots in the solution. For comparison, the toxicity of parathion under these conditions also is included.

TABLE III

| Active agent | Concentration (p.p.m.) for $LD_{50}$ |
| --- | --- |
| Parathion | >100 |
| 2-carbomethoxy-1-methylvinyl methyl p-nitrophenyl phosphate | 1.0 |

EXAMPLE VI

The residual toxicity of two representative members of the compounds of the invention were determined in comparison with the toxicity of parathion under the same conditions. Emulsible concentrates were prepared containing by volume: 25% toxicant, 65% xylene, 5% Triton X-155 emulsifier and 5% Triton B-1956. Portions of these concentrates were mixed and shaken with water in such proportions as to give the concentrations tabulated below. The aqueous emulsions were sprayed in uniform fashion on two primary leaves of potted pinto bean plants. This was accomplished by rotating the plants on a turntable while applying the spray. Seven days after the spray applications were made the plants were infested with larvae of the Mexican bean beetle. A mortality count of the larvae was made 1 day later, with the following results. For comparison the toxicity of parathion under these conditions is included.

TABLE IV

| Toxic agent | Concentration (percent w.) | Percent mortality |
| --- | --- | --- |
| 2-Carbomethoxy-1-methylvinyl methyl p-nitrophenyl phosphate | 0.02 | 65 |
| 2-carbethoxy-1-methylvinyl ethyl p-nitrophenyl phosphate | 0.02 | 90 |
| Parathion | 0.03 | 70 |

I claim as my invention:
1. A compound of the formula

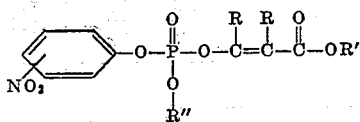

wherein R is chosen from the group consisting of hydrogen and lower alkyl radicals, and R' and R'' individually represent lower alkyl radicals.

2. 2-carbomethoxy-1-methylvinyl methyl p-nitrophenyl phosphate.

3. 2-carbethoxy-1-methylvinyl ethyl p-nitrophenyl phosphate.

References Cited in the file of this patent

UNITED STATES PATENTS

| | | |
|---|---|---|
| 2,744,128 | Morris et al. | May 1, 1956 |
| 2,750,324 | Bender | June 12, 1956 |
| 2,758,954 | Tidwell | Aug. 14, 1956 |
| 2,765,331 | Whetstone et al. | Oct. 2, 1956 |
| 2,769,743 | Mattson | Nov. 6, 1956 |

FOREIGN PATENTS

| | | |
|---|---|---|
| 729,998 | Great Britain | May 11, 1955 |
| 448,123 | Italy | May 2, 1949 |
| 257,649 | Switzerland | May 2, 1949 |

OTHER REFERENCES

Ivy: "Agricultural Chemicals," vol. 8, pp. 47–50, 137–9, April 1953.